Nov. 20, 1923.   1,475,140
T. PHANEUF
RESILIENT TIRE
Filed Jan. 18, 1923
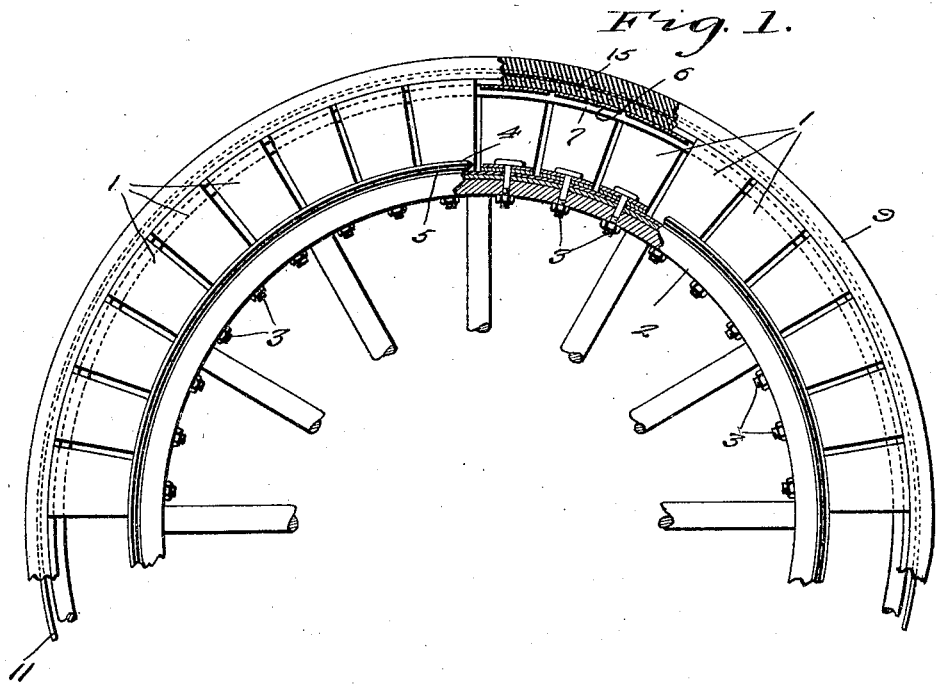
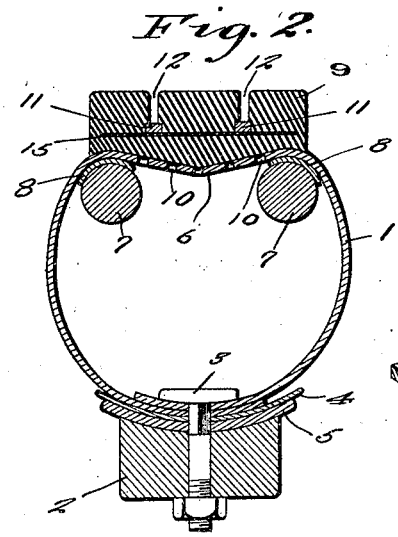
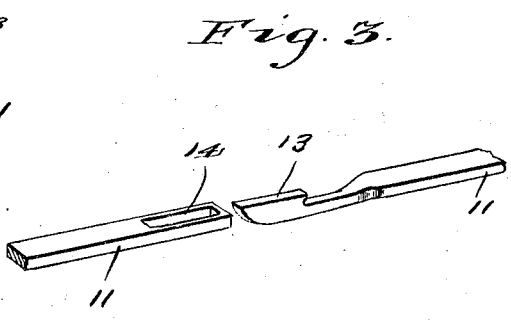
Toussaint Phaneuf INVENTOR
ATTORNEY
WITNESSES Patented Nov. 20, 1923.

1,475,140

UNITED STATES PATENT OFFICE.

TOUSSAINT PHANEUF, OF WASHINGTON, DISTRICT OF COLUMBIA.

RESILIENT TIRE.

Application filed January 18, 1923. Serial No. 613,508.

*To all whom it may concern:*

Be it known that I, TOUSSAINT PHANEUF, a citizen of the United States, residing at Washington, in the District of Columbia, have invented new and useful Improvements in Resilient Tires, of which the following is a specification.

This invention relates to a resilient tire, the general object of the invention being to provide means for eliminating the pneumatic tire and thus do away with the danger of blow-outs and punctures while securing easy riding of the vehicle through the use of springs.

Another object of the invention is to provide means whereby the springs at the top of the wheel will act in conjunction with those at the bottom of the wheel for resisting the movement of the tread part of the wheel.

A further object of the invention is to provide a rubber tread part for the tire with means for detachably holding it to the spring part.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a fragmentary side elevation of a wheel constructed in accordance with my invention, parts being shown in section.

Figure 2 is a cross sectional view.

Figure 3 is a detail view.

As shown in these views 1 indicates a plurality of spring strips which are bent into the cross sectional shape, shown in Figure 2, and which have their overlapping ends secured to the felly 2 of the wheel by the bolts 3, a strip 4 of canvas or the like being placed between the rim 5 and the strip to prevent wear. Each bolt is provided with an enlarged head for engaging the strip so as to hold the end parts of the strip against movement. The tread part of each strip is of flat V-shape in cross section, as shown at 6, and a pair of rings 7 are placed in the springs, these rings being so located that the V-shaped parts 6 are arranged between them. Strips 8 of canvas or the like may be placed between the rings and the adjacent parts of the spring strips. A tread 9, of rubber or the like, is placed upon the springs and this tread is preferably connected with the springs by cement or the like and also by perforating the strips, as shown at 10, which receive parts of the tread, as shown in Figure 2. The tread is further held in place by means of the bands 11 which are placed in grooves 12 formed in the tread and which have their ends connected together by means of the hook 13 on one end engaging an elongated eye 14 in the other end. The rubber or other material from which the tread is made may be pushed aside to permit the hooks to be placed in the eyes. The tread is provided with a breaker strip 15 of canvas or the like which is embedded in the tread in the usual manner.

From the above it will be seen that the springs will impart resiliency to the structure as a whole so that a wheel equipped with this invention will have the same riding qualities as a pneumatic tire. The rings 7 act as a frame for the strips and these rings will cause the strips at the top of the wheel to help the strips at the bottom of the wheel to carry the load. After the outer part of the tread is worn down it may be removed to the breaker strip and a new part substituted.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A resilient wheel of the class described comprising a plurality of spring strips of loop shape, means for securing the ends of each strip to the felly of the wheel, rings passing through the strips and engaging the tread parts thereof and a tread of resilient material placed upon the tread parts of the strips.

2. A resilient wheel of the class described comprising a plurality of spring strips of loop shape, means for securing the ends of each strip to the felly of the wheel, rings passing through the strips and engaging the tread parts thereof, a tread of resilient material placed upon the tread parts of the strips, said tread parts of the strips being of V-shape in cross section and bridging the space between the rings so as to form a seat for the resilient tread.

3. In combination with a wheel, a plurality of spring strips bent into loop shape, bolts connecting the overlapping ends of each strip to the felly of the wheel, a pair of rings passing through the strips and engaging the outer parts thereof, each strip having the part between the rings of V-shape and perforated and a tread of resilient material engaging the V-shaped parts.

4. In combination with a wheel, a plurality of spring strips bent into loop shape, bolts connecting the overlapping ends of each strip to the felly of the wheel, a pair of rings passing through the strips and engaging the outer parts thereof, each strip having the part between the rings of V-shape and perforated, a tread of resilient material engaging the V-shaped parts, said V-shaped parts being perforated to receive portions of the tread.

5. In combination with a wheel, a plurality of spring strips bent into loop shape and having their ends connected with the felly of the wheel, a pair of rings passing through the strips and engaging the outer parts thereof, strips of flexible material placed between the contacting parts of the rings and spring strips and a tread of resilient material engaging the tread parts of the strips.

6. In combination with a wheel, a plurality of spring strips bent into loop shape and having their ends connected with the felly of the wheel, a pair of rings passing through the strips and engaging the outer parts thereof, strips of flexible material placed between the rings and the strips, a tread of resilient material engaging the tread parts of the strips, and metal rings for holding the tread parts upon the strips.

In testimony whereof I affix my signature.

TOUSSAINT PHANEUF.